US011385789B1

(12) United States Patent
Skovsgaard et al.

(10) Patent No.: US 11,385,789 B1
(45) Date of Patent: Jul. 12, 2022

(54) SYSTEMS AND METHODS FOR INTERACTING WITH DISPLAYED ITEMS

(71) Applicant: Facebook Technologies, LLC, Menlo Park, CA (US)

(72) Inventors: Henrik Hegner Tomra Skovsgaard, Menlo Park, CA (US); Lars Anders Bond, San Mateo, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 36 days.

(21) Appl. No.: 16/519,879

(22) Filed: Jul. 23, 2019

(51) Int. Cl.
| | |
|---|---|
| *G06F 3/0488* | (2022.01) |
| *G06F 3/04883* | (2022.01) |
| *G06F 3/0482* | (2013.01) |
| *G06F 3/01* | (2006.01) |
| *G06F 3/04845* | (2022.01) |
| *G06F 3/04817* | (2022.01) |

(52) U.S. Cl.
CPC .......... *G06F 3/04883* (2013.01); *G06F 3/016* (2013.01); *G06F 3/0482* (2013.01); *G06F 3/04845* (2013.01); *G06F 3/04817* (2013.01)

(58) Field of Classification Search
CPC ............. G06F 3/04812; G06F 3/04815; G06F 3/0484; G06F 3/0482; G06F 3/0488; G06F 1/1622; G06F 3/03544; G06F 17/276; G06F 1/1643; G06F 1/1647; G06F 3/04897; G06F 3/04845; G06F 3/0414; G06F 3/04817; G06F 3/04883; G06F 3/016; G06K 9/6298; H04N 13/0007; H04N 13/047; H04N 5/23216; G09G 5/38; G16H 40/63; A61B 34/10
See application file for complete search history.

(56) References Cited

U.S. PATENT DOCUMENTS

| | | | | |
|---|---|---|---|---|
| 7,305,631 | B1* | 12/2007 | Bort | G06F 1/1622 |
| | | | | 715/856 |
| 9,760,151 | B1* | 9/2017 | Hou | G06F 3/0488 |
| 10,073,585 | B2* | 9/2018 | Kanda | G06F 3/04847 |
| 10,073,612 | B1* | 9/2018 | Hale | G06F 3/0488 |
| 10,318,034 | B1* | 6/2019 | Hauenstein | G06F 3/0412 |
| 10,444,005 | B1* | 10/2019 | Dryer | G01B 11/026 |
| 11,221,748 | B2* | 1/2022 | Chandler | G06F 3/0482 |
| 2004/0021644 | A1* | 2/2004 | Enomoto | G06F 3/04812 |
| | | | | 345/173 |
| 2004/0140956 | A1* | 7/2004 | Kushler | G06F 3/0236 |
| | | | | 345/168 |

(Continued)

*Primary Examiner* — Steven P Sax
(74) *Attorney, Agent, or Firm* — Foley & Lardner LLP

(57) ABSTRACT

Disclosed herein includes a system, a method, and a device for interacting with displayed items. A contact point can be established with a surface of a contact panel and the contact panel can be operated in a navigation mode during which a selection element, for selecting one or more items of a user interface (UI) in a display of a second device, is maintained at a determined location in the display. The UI can be moved in the display relative to the selection element as the selection element is maintained at the determined location, by moving the contact point on the surface of the contact panel in the navigation mode. At least one item of the UI that is moved within a selection threshold of the selection element can be selected by removing the contact point with the contact panel.

14 Claims, 5 Drawing Sheets

(56) References Cited

U.S. PATENT DOCUMENTS

| | | | | |
|---|---|---|---|---|
| 2012/0105358 | A1* | 5/2012 | Momeyer | G06F 3/04883 345/174 |
| 2012/0131458 | A1* | 5/2012 | Hayes | H04N 21/4786 715/716 |
| 2013/0246970 | A1* | 9/2013 | Helle | G06F 3/0482 715/822 |
| 2014/0026101 | A1* | 1/2014 | Pallakoff | G06F 3/0482 715/841 |
| 2014/0143683 | A1* | 5/2014 | Underwood, IV | G06F 3/0482 715/752 |
| 2014/0173484 | A1* | 6/2014 | Hicks | G06F 3/0482 715/769 |
| 2014/0344766 | A1* | 11/2014 | Cao | G06F 3/0481 715/863 |
| 2014/0364212 | A1* | 12/2014 | Osman | G06F 3/013 463/31 |
| 2014/0365851 | A1* | 12/2014 | Kroupa | G06F 3/0483 715/205 |
| 2015/0212681 | A1* | 7/2015 | Shinozaki | G06F 1/163 345/8 |
| 2015/0317051 | A1* | 11/2015 | Shinohara | G06F 3/0488 715/251 |
| 2016/0182877 | A1* | 6/2016 | Deluca | H04N 13/332 348/53 |
| 2016/0196693 | A1* | 7/2016 | Kobayashi | G06F 3/0346 345/633 |
| 2016/0259413 | A1* | 9/2016 | Anzures | G06T 13/80 |
| 2017/0068371 | A1* | 3/2017 | Fleizach | G06F 3/0488 |
| 2017/0116339 | A1* | 4/2017 | Stein | G06F 16/9535 |
| 2017/0351399 | A1* | 12/2017 | Pallakoff | G06F 3/0488 |
| 2017/0357317 | A1* | 12/2017 | Chaudhri | G06F 3/016 |
| 2018/0005607 | A1* | 1/2018 | Tsukahara | G06F 3/0488 |
| 2018/0091728 | A1* | 3/2018 | Brown | G06F 3/0488 |
| 2018/0277067 | A1* | 9/2018 | Tentinger | G06F 3/012 |
| 2018/0324177 | A1* | 11/2018 | Wang | H04W 12/126 |
| 2018/0335936 | A1* | 11/2018 | Missig | G06F 3/04883 |
| 2019/0065027 | A1* | 2/2019 | Hauenstein | G06F 3/011 |
| 2019/0324549 | A1* | 10/2019 | Araki | G06F 3/04815 |
| 2019/0339855 | A1* | 11/2019 | Walkin | G06F 3/0485 |
| 2019/0346885 | A1* | 11/2019 | Sepulveda | G06F 1/1616 |
| 2020/0054398 | A1* | 2/2020 | Kovtun | G16H 40/63 |
| 2020/0410051 | A1* | 12/2020 | Mannby | G06F 3/0237 |

* cited by examiner

SYSTEMS AND METHODS FOR INTERACTING WITH DISPLAYED ITEMS

FIELD OF DISCLOSURE

The present disclosure is generally related to display systems and methods, including but not limited to systems and methods for interacting with displayed items.

BACKGROUND

Wearable display technologies can provide a virtual reality or augmented reality experience to a user. A display device can provide a series of computer generated images to allow the user to interact with the respective images. For example, the display device can include a head mounted device that is positioned over or within the field of view of the user such that the field of view of the display device replaces the user's natural field of view.

SUMMARY

Devices, systems and methods for controlling displayed elements or items (e.g., displayed using wearable display technologies) via inputs received through an external device are provided herein. A user can provide feedback through the external device (e.g., contact panel) to control the movement of different selectable elements displayed in a field of view of the display device. For example, responsive to contact or motion along a surface of the external device, an input signal can be provided to change a mode of the display device, move content within a display of the display device, or indicate a selection of different features or items displayed or rendered within the display of the display device. Thus, the external device can be provided as part of a selection paradigm, to drive or control certain items visualized within the field of view of the wearable display responsive to interactions from a user of the external device.

In at least one aspect, a method is provided. The method can include, responsive to a user establishing a contact point with a surface of a contact panel, operating the contact panel in a navigation mode during which a selection element for selecting one or more items of a user interface (UI) in a display, is maintained at a determined location in the display. The method can include moving the UI in the display relative to the selection element maintained at the determined location, by moving the contact point on the surface of the contact panel in the navigation mode. The UI can include at least one item that is selectable using the selection element. The method can include selecting one of the at least one item that is moved within a selection threshold of the selection element, by removing the contact point with the contact panel.

In some embodiments, the display can include a wearable display device that provides a field of view to the user. The method can include establishing contact with the surface i) for at least a predefined time period, ii) using a specified force on the surface, or iii) using a predefined pattern of presses or taps on the surface. The method can include determining, via the contact panel, a first direction of movement of the contact point on the surface of the contact panel, and transmitting, by the contact panel, a signal to a processor of the display to render an image of the UI moving in a direction in accordance with the first direction of movement. The method can include moving the UI in the display in a direction that is opposite to or same as a direction of movement of the contact point on the surface of the contact panel.

In some embodiments, the method can include moving the UI in the display at a speed that is relative to a speed of movement of the contact point on the surface of the contact panel. The contact point movement can be linear or non-linear. For example, in some embodiments using non-linear movement, the contact point movement (or touch point movement) can increase based on a distance to the respective contact point. The method can include moving the UI in the display by a spatial displacement that is relative to that of the contact point on the surface of the contact panel. In some embodiments, the at least one item can include at least one of an icon, a symbol, a text element, a keypad element, an image, a file or folder, or an artificial reality (e.g., virtual reality, mixed reality or augmented reality) object.

The method can include detecting that the one of the at least one item is within the selection threshold of the selection element. The method can include activating a selection mode of the contact panel, in response to the detecting that the one of the at least one item is within the selection threshold. The method can include providing sensory feedback to the user to indicate that the one of the at least one item is selectable using the selection element. The method can include displaying supplemental information or at least one supplemental selectable item corresponding to the detected one of the at least one item.

In at least one aspect, a device is provided. The device can include a display and one or more processors. The one or more processors can be configured to, responsive to a user establishing a contact point with a surface of a contact panel, operate the contact panel in a navigation mode during which a selection element for selecting one or more items of a UI in the display, is maintained at a determined location in the display, The one or more processors can be configured to move the UI in the display relative to the selection element maintained at the determined location, by moving the contact point on the surface of the contact panel in the navigation mode. The UI can include at least one item that is selectable using the selection element. The one or more processors can be configured to select one of the at least one item that is moved within a selection threshold of the selection element, by removing the contact point with the contact panel.

In some embodiments, the display can include a wearable display device that provides a field of view to the user, for example, to provide virtual reality (VR), augmented reality (AR), or mixed reality (MR) experience. The one or more processors can be configured to detect that the contact point is established with the surface of the contact panel, by detecting that contact with the surface is established i) for at least a predefined time period, ii) using a specified force on the surface, or iii) using a predefined pattern of presses or taps on the surface. The one or more processors can be configured to determine a first direction of movement of the contact point on the surface of the contact panel and transmit a signal to a processor of the display to render an image of the UI moving in a direction in accordance with the first direction of movement.

The one or more processors can be configured to detect that the one of the at least one item is within the selection threshold of the selection element and activate a selection mode of the contact panel in response to the detecting. The one or more processors can be configured to activate the selection mode to provide sensory feedback to the user to indicate that the one of the at least one item is selectable using the selection element. The one or more processors can be configured to activate the selection mode to display supplemental information or at least one supplemental selectable item corresponding to the detected one of the at least one item.

In at least one aspect, a non-transitory computer readable medium storing instructions is provided (e.g., to implement the systems and/or methods discussed herein). The instructions when executed by one or more processors can cause the one or more processors to, responsive to a user establishing a contact point with a surface of a contact panel, operate the contact panel in a navigation mode during which a selection element for selecting one or more items of a UI in the display, is maintained at a determined location in the display. The instructions when executed by one or more processors can cause the one or more processors to move the UI in the display relative to the selection element maintained at the determined location, by moving the contact point on the surface of the contact panel in the navigation mode. The UI can include at least one item that is selectable using the selection element. The instructions when executed by one or more processors can cause the one or more processors to select one of the at least one item that is moved within a selection threshold of the selection element, by removing the contact point with the contact panel. The instructions when executed by one or more processors can cause the one or more processors to detect that the one of the at least one item is within the selection threshold of the selection element and activate a selection mode of the contact panel in response to the detecting.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1A:
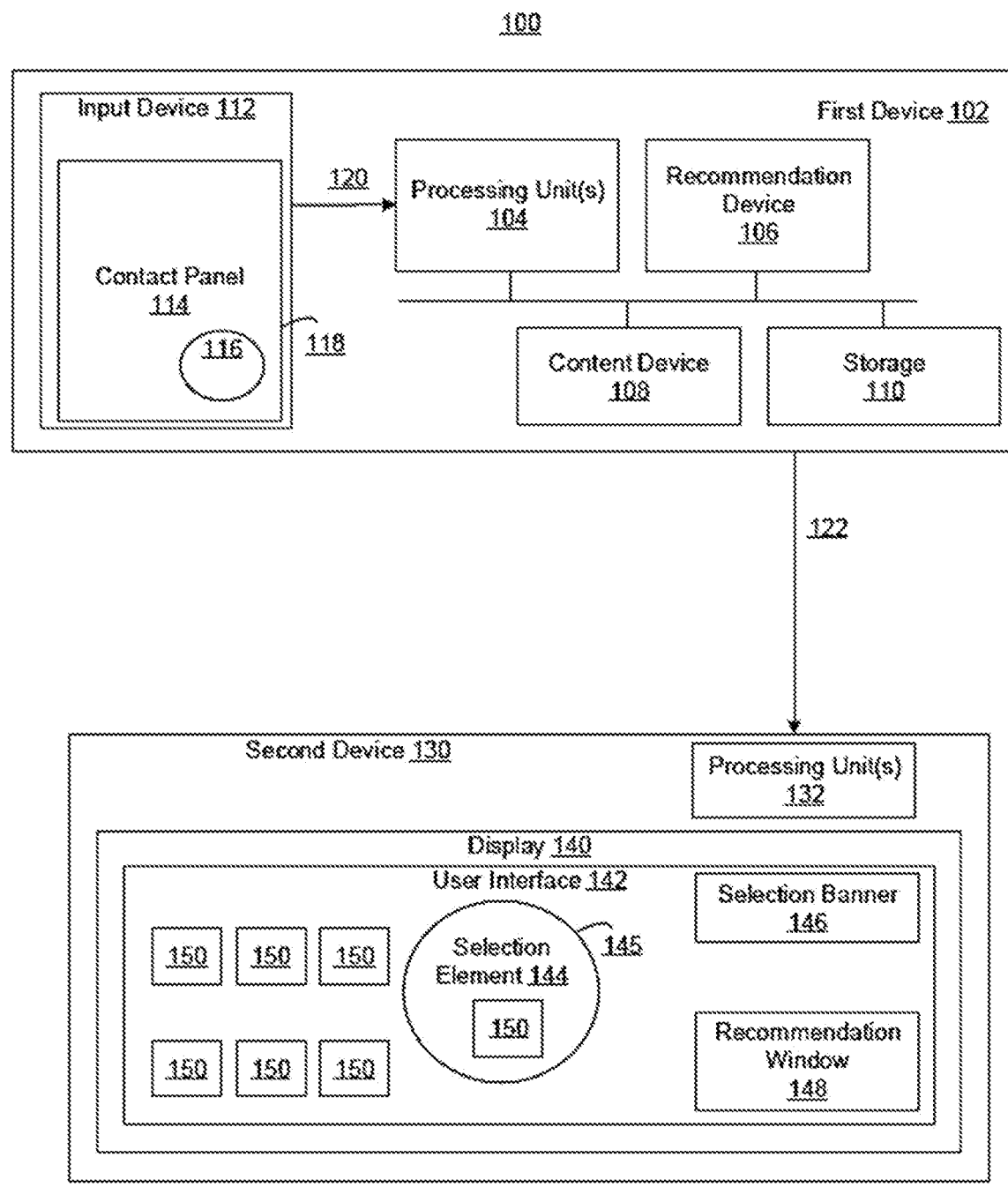
FIG. 1A is a block diagram of an embodiment of a system for interacting with an item displayed on a device, through input received via an external device, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

For purposes of reading the description of the various embodiments of the present invention below, the following descriptions of the sections of the specification and their respective contents may be helpful:

Section A describes embodiments of devices, systems and methods for interacting with items displayed on a device.

A. Interacting with Items Displayed on a Device

Devices, systems and methods for interacting with content or items displayed on a device (e.g., a head mounted display unit), through input received through an external device (e.g., with a touchscreen or other contact panel), are provided herein. In some embodiments, the devices, systems and methods can include generating and controlling input for wearable display technologies using a slide selection technique performed on a handheld device. The side selection technique (or process) can include establishing contact with a contact panel to allow a sliding action on the contact panel to move selectable items towards or away from a fixed selection element or reticle, and releasing the contact while the selection element coincides with a selectable item, to perform a selection of the item. The external device can include, but is not limited to a handheld device having a contact panel that can generate and provide input signals to a second different device (e.g. a computer, image projection device, or a wearable unit) to control movement of different selectable elements displayed in a field of view of a display (e.g., screen, or rendering or projection space) of the second device. The input signals (e.g., press, touch, slide, release) can indicate a selection of one of various features or content items (e.g., keys of a displayed keyboard, virtual reality (VR) features) within the field of view of the display. For example, responsive to a sliding motion along or contact with a surface of the contact panel of the first device, an input signal can be provided to change a mode of the display of the second device or indicate a selection of different features or content items within the field of view of the display of the second device.

The field of view of the display of the second device can provide a user interface (e.g., including selectable elements or items) and a selection element (e.g., selection reticle, graticule or cursor) positioned in a static (e.g., fixed, stationary, predetermined) position within the field of view. The wearable display can include or be associated with operating modes/phases such that in response to a first contact type (e.g., press, touch, tap) via a surface of the contact panel of the first device, the display of the second device can initiate a first mode/phase (e.g., a positioning or navigation mode, for moving or positioning selectable items for instance). In some embodiments, the first contact type can include a gesture. For example, the first device can include a gyro sensor, angular velocity sensor or other form of a positional sensor to detect a gesture or corresponding movement (e.g., angular velocity) of the first device. In or during the first mode/phase, detected motion or sliding motion in contact with and along the surface of contact panel of the first device can be used control movement of the user interface (e.g., including selectable elements) within the display of the second device such that the user interface and the selectable items move, rotate or change position in response to a corresponding (e.g., similar or opposite) sliding motion or movement along or on the surface of the contact panel of the first device. The selection element can maintain a static position (in the display or relative to the display) in the first mode/phase such that, in response to motion or movement (e.g., sliding action while in contact) along or on the surface of the contact panel, the user interface moves with respect to the display of the second device, but the selection element maintains its position with respect to the display of the second device. The selection element can potentially modify view parameters of different features or items (e.g., selectable elements) within the display, for example, to magnify a feature or item when the selection element is hovering over the respective feature or item. In response to a condition (e.g., selection element being within a selection threshold of a selectable item) and/or a second contact type (e.g., release from contact/touch) via the surface of the contact panel of the first device, the first device can activate or operate in a second mode/phase (e.g., a selection mode/phase). For example, the release can activate selection of a selectable element over which the selection element is hovering, at the instant of release, and can end the navigation mode/phase. For example, in the selection mode/phase, the feature or item targeted by (e.g., pointed to, contained by and/or magnified by) the selection element in the display, can be selected.

In some embodiments involving text input for instance, a user of the first device can use the contact panel of the first device to move different letters (e.g., of a virtual keyboard) in and out of the field of view of the display, and move the different letters within the field of view of the display of the second device relative to the static selection element, for selection, to spell out various words or phrases using the slide selection technique. As each icon, symbol or alphanumeric character is selected, the display system can generate suggestions or recommendations based in part on the already selected icon(s), symbol(s) or alphanumeric character(s). These recommendations can be provided within the display of the second device such that a user of the first device can select at least one recommendation using the selection element. The slide selection technique can provide different user feedback to indicate to a user the current operational mode/phase (e.g., ready to move, or ready to select a selectable element) or a change in the operational mode/phase, of the first device and/or second device. For example, the first device can include tactile feedback, audio feedback, and visual feedback to alert a user of a change in or between operational modes/phases of the second device or to show user progress in a current series of interactions (e.g., tap, slide, input device gesture, release) with the second device. A combination of input signals from the first device can be utilized to manipulate a field of view of the second device. Different forms of user feedback through the first device and/or the second device can allow a user to feel in control when navigating selectable elements of a user interface (UI) of the second device.

Referring now to FIG. 1A, an example system 100 for controlling interactions with content on an external device, such as but not limited to wearable display technologies using a slide selection technique performed on a handheld device is provided herein. The system 100 can generate an input for a device to control movement and selection of one or more items displayed to a user through the device. In brief overview, the system 100 can include a first device 102 having an input device 112 (e.g., touchscreen, touch pad, or other contact panel) to receive input signals 120 (e.g., contact signals) from a user and generate control signals 122 to move (e.g. slide or shift) a user interface 142 (e.g., background portion) displayed in a display 140 of a second device 130 or select at least one item 150 provided or moved within a selection threshold 145 of a selection element 144 of the display 140 of the second device 130.

The first device 102 can include a computing system, user input device or user output device. In some embodiments, the first device 102 can be implemented, for example, as a device (e.g., consumer device) such as a smartphone, other mobile phone, tablet computer, wearable computing device (e.g., smart watch, smart eyeglasses, head mounted display), desktop computer, laptop computer, television or implemented with distributed computing devices. The first device 102 can be implemented to provide virtual reality (VR), augmented reality (AR), mixed reality (MR) experience. In some embodiments, the first device 102 can include conventional, specialized or custom computer components such as processors 104, a storage device 110, a network interface, a user input device, and/or a user output device.

The first device 102 can include one or more processors 104. The one or more processors 1102 can include any logic, circuitry and/or processing component (e.g., a microprocessor) for pre-processing input data for any one or more of the first device 102, an input device 112, a contact panel 114 (e.g., touchscreen), or a second device 130, and/or for post-processing output data for any one or more of the first device 102, the input device 112, the contact panel 114, or the second device 130. The one or more processors 104 can provide logic, circuitry, processing component and/or functionality for configuring, controlling and/or managing one or more operations of the first device 102, the input device 112, the contact panel 114, or the second device 130. For instance, a processor 104 may receive data or signals associated with the contact panel 114 to control, generate, modify, move and/or update a user interface 142 and items 150 to be displayed through a display 140 or the second device 130. In some embodiments, a processor 104 can control or reduce power consumption for one or more of the first device 102, the input device 112, the contact panel 114, or the second device 130. As another example, a processor 104 can partition and/or re-arrange data for separate processing (e.g., at storage 110), sequential processing (e.g., at storage 110, at different times), or for storage in different memory slices of a storage device, or in different storage devices. In some embodiments, the processor(s) 104 can configure the first device 102 to operate for a particular context (e.g., in a navigation mode and/or a selection mode), provide a certain type of processing, and/or to address a specific type of input data, e.g., by identifying, selecting and/or loading items 150 or recommendations 152 for the display 140 of the second device 130.

The first device 102 can include a recommendation device 106. The recommendation device 106 can include or be implemented in hardware, or at least a combination of hardware and software. The recommendation device 106 can generate one or more recommendations 152 for items 150 to be provided to a user of the second device 130, for example, through the display 140. The recommendation device 106 can include an algorithm to generate one or more recommendations 152 for a user based in part on a user history, one or more previous selections of items 150, a user profile or a combination of two or more of a user history, one or more previous selections of items 150 and a user profile. For example, the recommendation device 106 can generate a recommendation 152 for a user based in part on at least one selection of an item 150 during a current user session with the second device 130. A user session can include or correspond to a current user interaction with the second device 130 or previous user interaction with the second device 130. In one embodiment, during a first user session, a user can select the letters "R" and "U" and the recommendation device 106 can generate a recommendation 152 of the letter "N" based in part on the previous selections of "R" and "U" to spell the word "RUN." In some embodiments, the recommendation device 106 can provide the recommendation within the selection element 144, a selection banner 146, or a recommendation window 148 provided within the display 140 of the second device 130.

The first device 102 can include a content device 108. The content device 108 can include or be implemented in hardware, or at least a combination of hardware and software. The content device 108 can generate one or more items 150 (e.g., content items) to be provided to a user of the second device 130, for example, through display 140. The items 150 can include text, images, icons, videos or other forms of interactive content. In some embodiments, the items 150 can include text (e.g., single words, numbers, phrases, sentences), alphanumeric characters, symbols or characters. The content device 108 can include an algorithm to generate one or more items 150 for a user based in part on a current user session with the second device 130. The content device 108 can include an algorithm to generate one or more items 150 for a user based in part on a user history, one or more previous user sessions, a current user session, a user profile or a combination of two or more of a user history, one or more previous user sessions, a current user session and a user profile. For example, a current user session can include a text entry session or keyboard image provided as a user interface 142 of the display 140 of the second device 130. The content device 108 can generate selectable items 150 representing or arranged in a keyboard layout that includes each of the letters, characters, numbers and symbols provided in a keyboard within the user interface 142 of the display 140.

The first device 102 can include a storage device 110. A storage device 110 can be designed or implemented to store, hold or maintain any type or form of data associated with the first device 102, input device 112, contact panel 114, and second device 130. For example, the data can include the input signals 120 received from the input device 112 and/or the contact panel 114 by the first device 102. The data can include output data from the first device 102 to the second device 130. For example, the output data can include control signals 122 transmitted to the second device 130 by the first device 102 to generate and control movement and display of a user interface 142 and items 150 through display 140. The output data can include control signals 122 transmitted to the second device 130 by the first device 102 to generate and control selection of items 150 by the selection element 144. The storage device 110 can include a memory (e.g., memory, memory unit, storage device, etc.). The memory may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an example embodiment, the memory is communicably connected to the processor via a processing circuit and includes computer code for executing (e.g., by the processing circuit and/or the processor) the one or more processes described herein.

The first device 102 can include an input device 112, be communicatively connected with the input device or be coupled with an input device 112. The input device 112 can include any device (or devices) via which a user can trigger, generate and/or provide signals to the first device 102; the first device 102 can interpret the signals as indicative of particular user requests or information. The input device 112 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on. In some embodiments, the input device 112 can include a contact panel 114 (e.g., display). The contact panel 114 can include or correspond to a touchscreen, touch pad, display device, television screen, monitor screen or display surface that allows for a user to interact with a computer (e.g., first device 102, second device 130) by contacting with areas on a surface 118 of the contact panel 114. The contact panel 114 can include a surface 118 for a user to contact (e.g., via a finger, pen and/or other tool) to provide input to the first device 102 and/or second device 130. In some embodiments, the input device 112 can include a mobile phone or handheld computing device and the contact panel 114 can correspond to a touchscreen of the mobile phone or handheld computing device. The first device 102 can receive an input signal 120 from a user of the first device 102 via the contact panel 114. The input signal 120 can be generated responsive to various types of contact with the contact panel 114. In some embodiments, the first input signal 120 can be generated responsive to a gesture (e.g., shake, swing, movement, pinch) made using the first device 102. For example, the input signal 120 can be generated responsive to at least one of a press, contact for a predetermined time period with the surface 118, or a predetermined pattern of presses or taps on the surface 118. In some embodiments, a contact point 116 can be established on the surface 118 of the contact panel 114. The contact point 116 can correspond or include an area, region, point or location on the surface 118 that is contacted. For example, the contact point 116 can be generated responsive to contact with the surface 118 of the contact panel 114, a predetermined level of pressure applied to the surface 118 of the contact panel 114, a capacitive or conductive contact with the surface 118 of the contact panel 114, or contact for a predetermined time period with the surface 118 of the contact panel 114. In some embodiments, the contact point 116 can be generated in response to contact through a contact device (e.g., stylus pen) or human contact (e.g., finger).

The first device 102 can be communicatively coupled with the second device 130. For example, the first device 102 can transmit one or more control signals 122 to the second device 130 to generate items 150 for display to a user of the second device 130 through display 140 or control interaction(s) of a user with one or more items 150 displayed to a user of the second device 130 through display 140. The second device 130 can include a computing system, user input device or user output device. In some embodiments, the second device 130 can be implemented, for example, as a device (e.g., consumer device) such as a smartphone, other mobile phone, tablet computer, image projector, wearable computing device (e.g., smart watch, eyeglasses, head mounted display), desktop computer, laptop computer, television or implemented with distributed computing devices. The second device 130 can be implemented to provide VR, AR, MR experience. In some embodiments, the second device 130 can include conventional, specialized or custom computer components such as processors 132, a storage device, a network interface, a user input device, and user output device. The second device 130 (e.g., user output device) can include one or more processors 132. The processors 132 can be the same as or similar to the processor 104 of first device 102.

The second device 130 can include a display 140. The second device 130 can include a display 140 (e.g., that includes or corresponds to a wearable display device) that provides a field of view to the user. In some embodiments, the display 140 can include, but not limited to, a television screen, monitor screen, a touchscreen, or other display device. The display 140 can be configured to display images generated by or delivered to second device 130. The display 140 can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like).

The display 140 can include (e.g., display, present or render) a user interface 142. The user interface 142 can include an area, three-dimensional volume, or portion of the display, a layer behind a main portion of a display, a backdrop or a digital image or overlay used as a background of a graphical user interface of the display 140. In some embodiments, the user interface 142 can include a wallpaper, desktop background or computer display background. In some embodiments, the user interface 142 can include an initial display layer or base layer of a display. For example, the user interface 142 can include or correspond to a base layer of a display provided to a user of the second device 130 that one or more other features, such as but not limited to items 150, are displayed on or within the display 140 of the second device 130. The dimensions of the user interface 142 can vary and can be selected, modified, magnified or scaled based at least in part on the dimensions of the display 140 and the second device 130. The user interface 142 (e.g., a graphical or virtual user interface) can represent or include an arrangement or layout of elements (e.g., child elements) such as items 150, a selection banner 146 and/or a recommendation window 148, relative to each other. The user interface 142 can serve or operate as an object (e.g. parent object) for containing and/or collectively moving the child elements within a field of view (e.g., viewport, rendering space) of the display 140

The display 140 can include a selection banner 146. The selection banner 146 can include a display region of the user interface 142. In some embodiments, the selection banner 146 can be generated by the first device 102 for display as an overlay of a region of the user interface 142. The selection banner 146 can include a digital display, electronic display or scrolling display provided within the user interface 142 or as an overlay of a region of the user interface 142. The selection banner 146 can display one or more items 150 previously selected by a user of the second device 130, one or more recommendations 152, or a combination of items 150 and recommendations 152. For example, the selection banner 146 can be generated in response to a selection of at least one item 150. In some embodiments, the selection banner 146 can be generated to alert a user of the second device 130 or one or more previous selections of items 150. The selection banner 146 can continually refresh or update responsive to at least one selection of an item 150. In some embodiments, the selection banner 146 continually refresh or update responsive to one or more user interactions with the input device 112 or contact panel 114 of the first device 102. The selection banner 146 can be generated in a variety of different shapes and/or sizes. In some embodiments, the selection banner 146 can be generated having a circular, spherical, rectangular, octagonal, or square shape.

The display 140 can include a selection element 144. The selection element 144 can include a display region of the user interface 142. The selection element 144 can include a pointer, cursor, graticule, reticle, target marker, reference point and/or cross-hair indicator, for moving or adjusting selectable items relative to the selection element 144. In some embodiments, the selection element 144 can be generated by the first device 102 for display as an overlay of a region of the user interface 142. The selection element 144 can include a digital, electronic or scrolling display element or indicator provided within the user interface 142 or as an overlay of a region of the user interface 142. The selection element 144 can be generated in a variety of different shapes and/or sizes. In some embodiments, the selection element 144 can be generated having a circular, spherical, rectangular, octagonal, or square shape.

In some embodiments, the selection element 144 can be configured to remain in a static position on the display, as the user interface 142 moves responsive to one or more user interactions with the input device 112 or contact panel 114 of the first device 102. For example, the first device 102 can be configured to generate a control signal 122 to move the user interface 142 while the selection element 144 maintains a current position or predetermined location on the display, and the different portions or regions of the user interface 142 can move relative to the selection element 144. The selection element 144 can be positioned over different regions of the user interface 142 relative to the movement of the user interface 142 to select one or more items 150 displayed within the respective regions of the user interface 142.

The selection element 144 can include a selection threshold 145. The selection threshold 145 can correspond to a region, extent, boundary or border that if one or more items 150 are included within, in part or in whole, the selection element 144 can select the respective one or more items 150. The selection threshold 145 can correspond to a region, extent, boundary or border that if a portion (e.g., edge, corner) of one or more items 150 are included within, the selection element 144 can select the respective one or more items 150. In some embodiments, the first device 102 can generate the control signal 122 to move the user interface 142 (relative to the selection element 144 and the display's boundary) such that the selection element 144 is displayed over a different portion or region within or over the user interface 142 responsive to establishing a contact point with the contact panel 114 and/or movement of the contact point along a surface of the contact panel 114 (e.g., via a swipe or slide action). The control signal 122 can include an instruction or command for a processor 132 of the second device 130 to move the user interface 142. The control signal 122 can include or signal a direction corresponding to a detected motion of the contact point along a surface of the contact panel 114 as controlled by a user of the second device 130. The control signal 122 can include or signal a new position or region for the user interface 142 within the display 140. The control signal 122 can include or signal a new set of coordinates for the user interface 142 within the display 140. The control signal 122 can include or signal a set of pixel values of the display 140 for the user interface 142.

In some embodiments, the first device 102 can generate a recommendation window 148. The recommendation window 148 can include a display region of the user interface 142. In some embodiments, the recommendation window 148 can be generated by the first device 102 for display as an overlay of a region of the user interface 142. The recommendation window 148 can include a digital display, electronic display or scrolling display provided within the user interface 142 or as an overlay of a region of the user interface 142. The recommendation window 148 can display one or more recommendations 152. For example, the recommendation window 148 can be generated in response to a selection of at least one item 150. The selection banner 146 can continually or dynamically refresh or update responsive to at least one selection performed in a recommendation window 148. In some embodiments, the recommendation window 148 continually or dynamically refreshes or updates responsive to one or more user interactions with the input device 112 or contact panel 114 of the first device 102. The recommendation window 148 can be generated in a variety of different shapes and/or sizes. In some embodiments, the recommendation window 148 can be generated having a circular, spherical, rectangular, octagonal, or square shape.

Figure 1B:
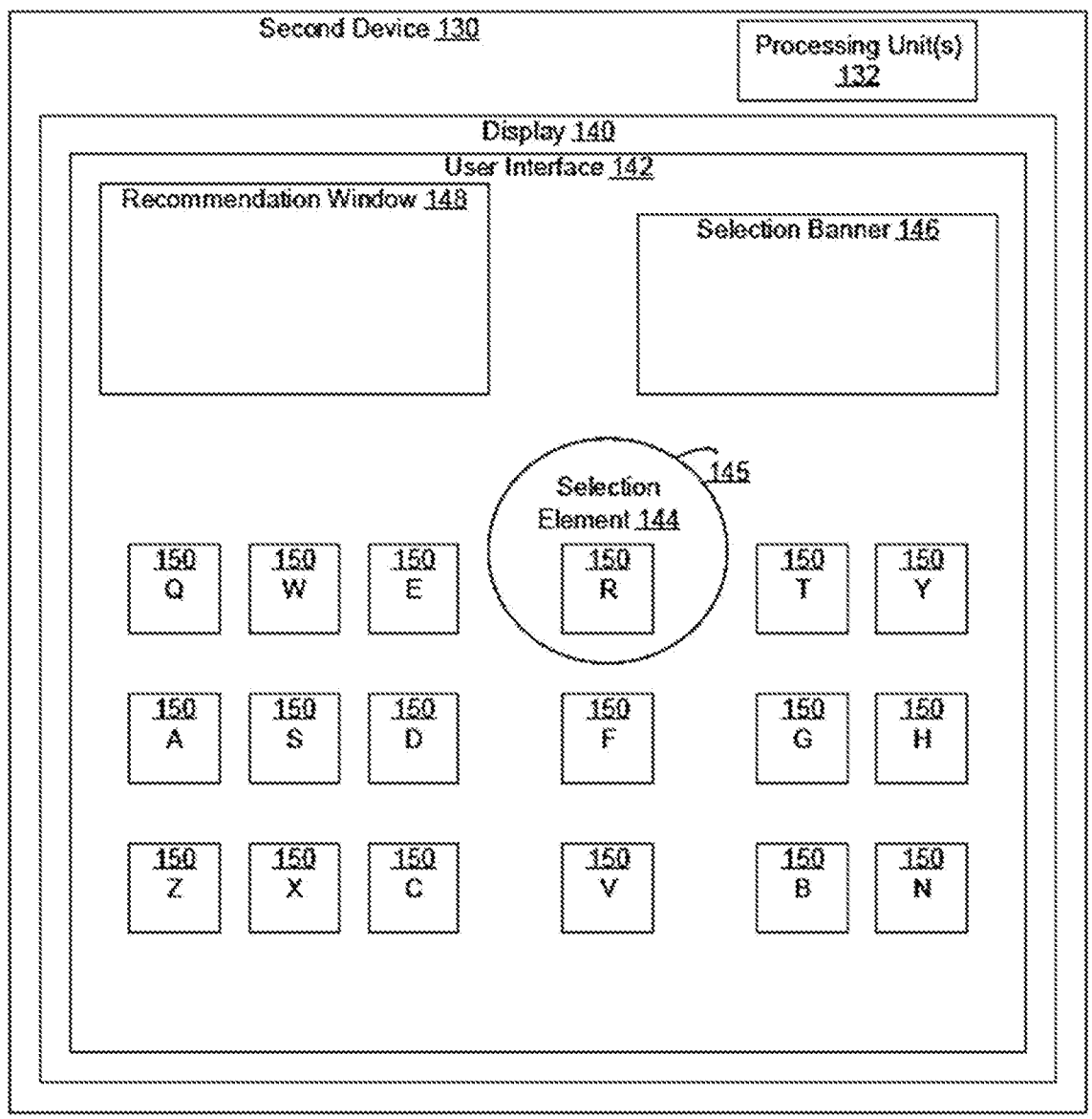
FIG. 1B is a block diagrams of an embodiment of a display of a second device, with displayed items controlled through input received from a first device, according to an example implementation of the present disclosure.

Now referring to FIG. 1B, an example embodiment of a display 140 of a second device 130 is provided. The second device 130 can include a wearable device. In some embodiments, the second device 130 can include or correspond to a wearable display, such as but not limited to, a head mounted display. The display 140 of the second device 130 can include or correspond to a field of view of or image rendering or projection space (in two or three dimensions) of the second device 130. The display 140 can include a user interface 142 having a plurality of items 150 provided within the user interface 142. In some embodiments, the items 150 can correspond to elements of a keyboard, including keys, buttons, icons, letters, numbers or symbols. The items 1250 can be provided or populated within the user interface 142 responsive to initiation of a user session with the second device 130 by a user, and/or initiation of a specific operating mode (e.g., navigation or positioning mode).

A selection element 144 can be displayed within, overlaid on, as part of, or separate from the user interface 142. In some embodiments, the selection element 144 can be displayed in a predetermined (e.g., static or fixed) location or position within the display, a field of view of the display, and/or the user interface 142, and can maintain the predetermined location during the user session. For example, the selection element 144 can maintain a static position during the user session. The predetermined location can vary depending on the context, user session and/or a configuration of the system. For example, in some embodiments, the predetermined location of the selection element 144 can be a center or middle portion of the user interface 142 or display 140, or an offset location that is offset with respect to the center or middle portion of the user interface 142 or display 140. In some embodiments, the selection banner 146 can be empty at one point as no item 150 has been selected during the current user session with the second device 130. The recommendation window 148 can for instance be empty at one point as no item 150 has been selected during the current user session with the second device 130. In some embodiments, the first device 102 can pre-populate the recommendation window 148 with recommendations 152 based in part on a user interacting with the second device 130, and/or a history of prior interactions.

To initiate an interaction mode or navigation mode, the user can establish contact with a surface 118 of a contact panel 114, such as a contact panel 114 of first device 102. The interaction mode or navigation mode (sometimes referred to positioning mode) can include or correspond to a mode for interacting with items 150 of user interface 142 and/or moving or positioning items 150 of user interface 142 (e.g., with respect to the statically located selection element 144). As illustrated in FIG. 1B, the items 150 are provided within the user interface 142 and the selection element 144 may initially be positioned at a predetermined location within the user interface 142. In some embodiments, the selection element 144 can be disposed over or provided as an overlay object or layer over the items 150 of the user interface 142. During the navigation mode, a user can move or re-position the user interface 142 and items 150 of the user interface 142 relative to the selection element 144. In some embodiments, the user can maintain contact with the surface 118 of the contact panel 114 to stay in navigation mode and move or re-position the user interface 142 and items 150 of the user interface 142 relative to the selection element 144 (e.g., by a sliding action on the surface 118). The user can establish contact at (e.g., press down on) a contact point 116 corresponding to a portion of the surface 118 of the contact panel 114 that the user contacts with or touches, for example, with a finger, stylus or other object. The user can maintain contact with the contact point 116 to stay in navigation mode and control or interact with the items 150 of the user interface 142. The selection element 144 can maintain the predetermined location or static position on (e.g., anchored to) the display, during navigation mode as the user interface 142 is moved relative to the selection element 144. In some embodiments, the user can move the contact point 116 for instance by moving the user's finger along the surface 118 of the contact panel 114, to move the user interface 142 and items 150 collectively in the display 140. For example, the user interface 142 and the items 150 can be moved relative to the selection element 144 maintained at the determined location, by moving the contact point 116 on the surface 118 of the contact panel 114 in the navigation mode.

Figure 1C:
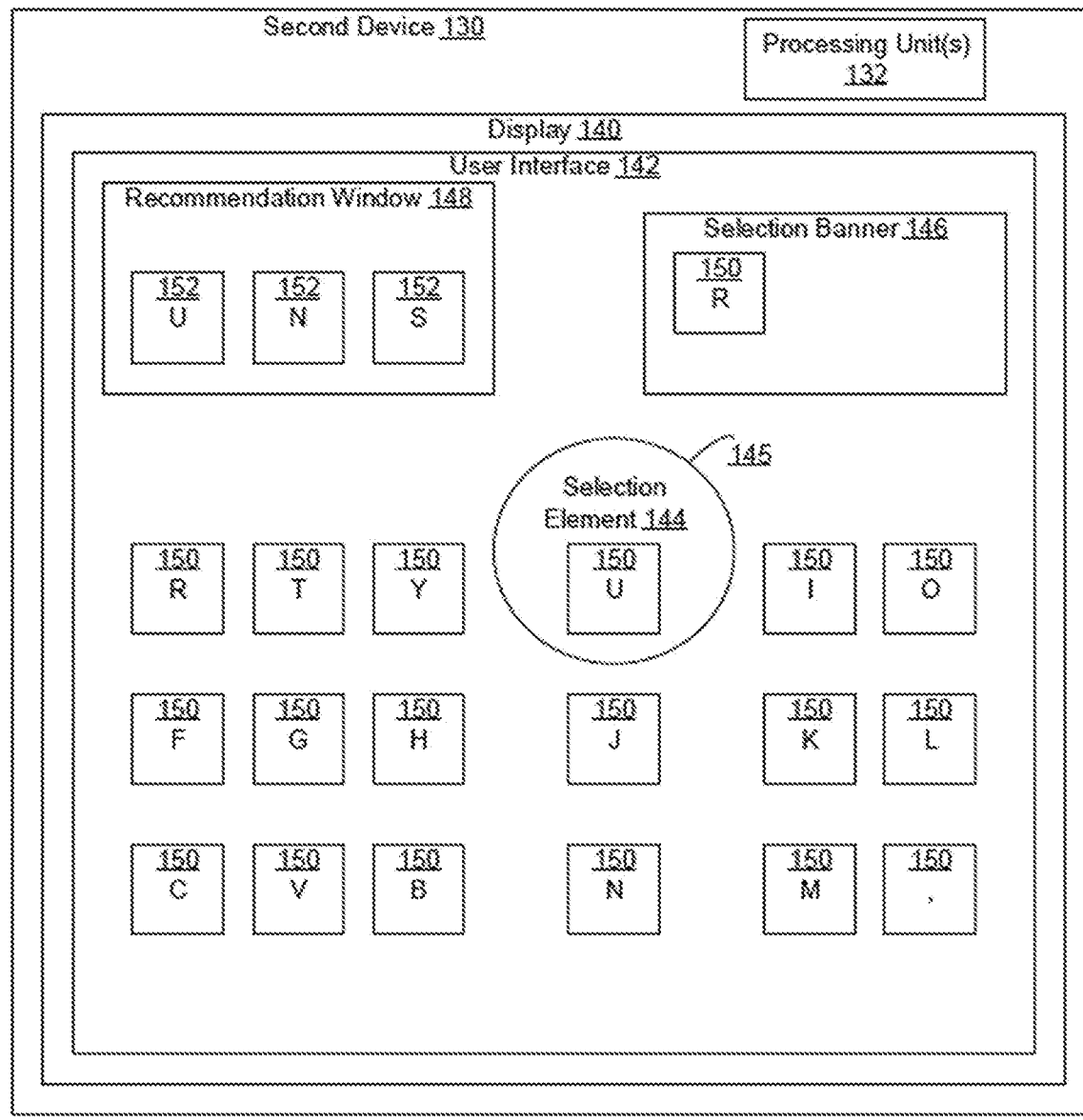
FIG. 1C is a block diagram of an embodiment of a display of a second device, with displayed items controlled through input received from a first device, according to an example implementation of the present disclosure.

For example and now referring to FIG. 1C, an example embodiment of the display 140 of the second device 130 of FIG. 1B with the user interface 142 and items 150 moved relative to the selection element 144 responsive to a user moving the contact point 116 on the surface 118 of the contact panel 114 in the navigation mode is shown. As illustrated in FIG. 1C, the user interface 142 and the items 150 have been moved relative to their position as illustrated in FIG. 1B, such that a different item 150, here corresponding to letter "U" is positioned within the selection threshold 145 of the selection element 144. The selection element 144 maintains the predetermined location or static position within the display 140 responsive to a user moving the contact point 116 on the surface 118 of the contact panel 114 in the navigation mode is shown. The user interface 142 including the items 150 can move in a direction, speed, and/or distance (spatial displacement) within display 140 corresponding to the direction, speed, and/or distance the user moves the contact point 116 on the surface 118 of the contact panel 114. In some embodiments, the user can move the contact point 116 in a first direction, at a first speed and a first distance to position the item 150 corresponding to letter "U" from its (initial) position within display 140 as shown in FIG. 1B to its (new or updated) position within the selection threshold 145 of the selection element 144 of display 140 as shown in FIG. 1C. In some embodiments, the first device 102 can determine, via the contact panel 114, a first direction of movement of the contact point 116 on the surface 118 of the contact panel 114. The first device 102 or the contact panel 114 can transmit a control signal 122 to a processor 132 of the second device 130 or display 140 to render an image of the user interface 142 and items 150 moving in a direction in accordance with the first direction of movement.

In some embodiments, the user interface 142 and items 150 can move within the display 140 in the same direction as the direction of movement of the contact point 116 on the surface 118 of the contact panel 114. In some embodiments, the user interface 142 and items 150 can move within the display 140 in a different direction or opposite direction as the direction of movement of the contact point 116 on the surface 118 of the contact panel 114. For instance, the movement of the contact point on the contact panel 114 may be in a direction for "moving" the selection element 144 towards a target item 150, while the effect (and imagery displayed to the user) is that the user interface 142 and the target item 150 is moved in the display (in a direction opposite to the movement of the contact point on the contact panel 114) towards the selection element 144 which remains static in the display. Such a mechanism can provide an intuitive and efficient manner for a user to navigate towards a target item for selection, interaction or exploration.

The user can move the contact point 116 on the surface 118 of the contact panel 114 to reposition different items 150 within the selection threshold 145 of the selection element 144, and the selection element 144 can be maintained in the predetermined location or static position within the display 140. To end the navigation mode or transition the display 140 from the navigation mode to a selection mode, the user can remove the contact point 116 with the contact panel 114. For example, the user can release or end contact with the surface 118 of the contact panel 114 to remove the contact point 116 with the contact panel 114. In some embodiments, a pressure on the contact point 116 with the contact panel 114 can change (e.g., decrease beyond a pressure threshold) to effectively remove the contact point 116 with the contact panel 114. In other words, a contact point may be established and maintained if the corresponding contact or touch is or is maintained at a level of pressure beyond a determined (e.g., minimum) pressure threshold.

In a selection mode (e.g., triggered when at least one item 150 becomes within a selection threshold of the selection element 144), the user can select at least one item 150 that is within a selection threshold 145 of the selection element 144. For example, and in the illustrative embodiment of FIG. 1C, the user can select an item 150 corresponding to letter "U" that is moved within the selection threshold 145 of the selection element 144 by removing the contact point 116 with the contact panel 114. In some embodiments, prior to selecting the item 150 (e.g., while operating in the selection mode), one or more recommendations 152 can be generated and displayed at the second device 130 to a user within a recommendation window 148 of the user interface 142. The recommendations 152 can be generated for instance based in part on one or more previously selected items 150 (e.g., "R") displayed within the selection banner 146. The recommendations 152 can correspond to an expected subsequent selection or selection that is predicted based in part on the one or more previously selected items 150, and/or an item 150 that has come within a selection threshold of the selection element 144. In some embodiments, the user can move the contact point 116 on the contact panel 114 on the first device 102 to position the selection element 144 of the display 140 of the second device 130 over at least one recommendation 152 within the recommendation window 148. The user can move the contact point 116 on the contact panel 114 on the first device 102 to position at least one recommendation 152 within the recommendation window 148 within the selection threshold 145 of the selection element 144. In some embodiments, the user can select at least one recommendation 152 within the selection threshold 145 of the selection element 144 by removing the contact point 116 with the contact panel 114 when the respective recommendation 152 is within the selection threshold 145 of the selection element 144.

Figure 2A:
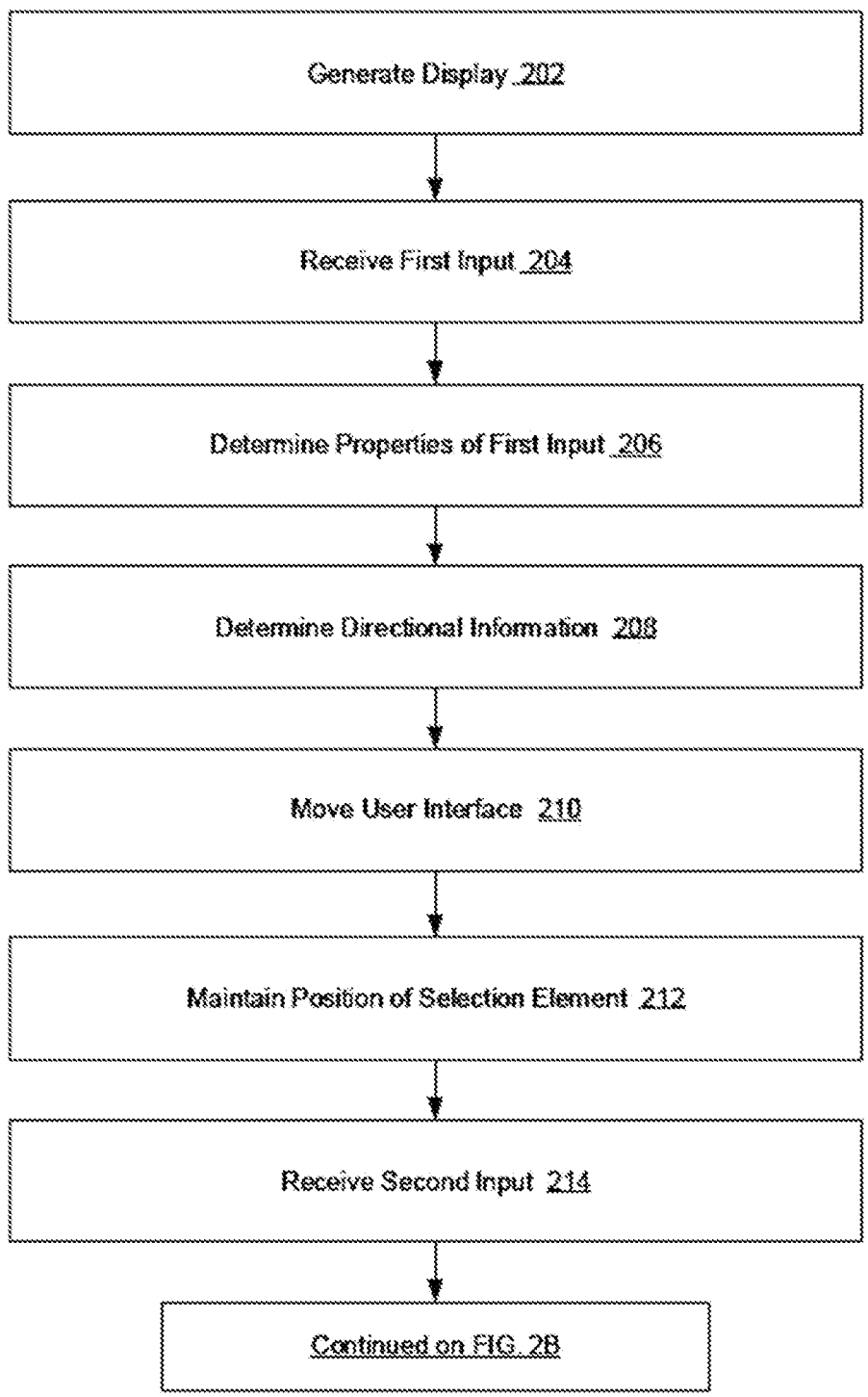
FIGS. 2A-2B include a flow chart illustrating a process or method for interacting with items displayed on a device, through input received via an external device, according to an example implementation of the present disclosure.
Figure 2B:
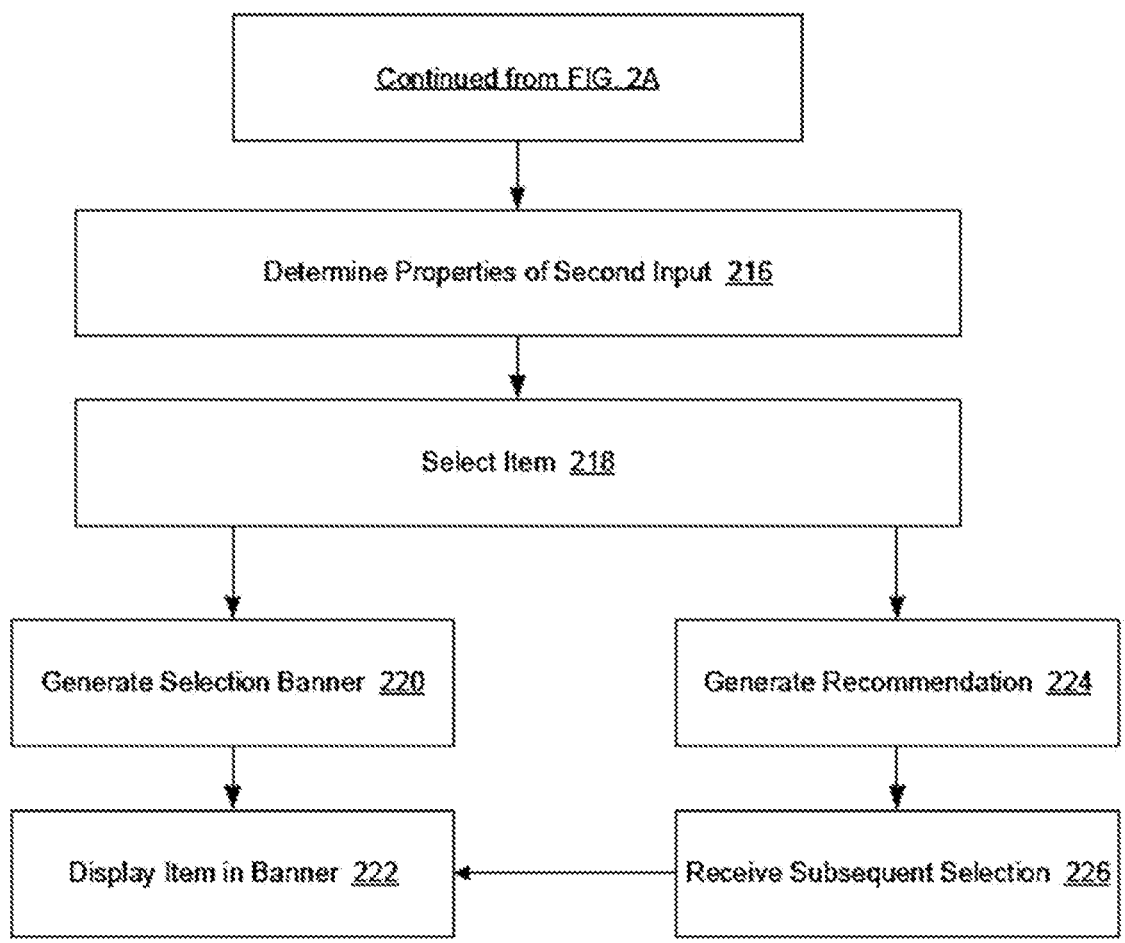

Now referring to FIGS. 2A-2B, a method 200 for interacting with items displayed on a device, through input received via an external device, is depicted. In brief overview, the method 200 can include one or more of: generating a display (202), receiving a first input signal (204), determining properties of first input signal (206), determining directional information for first input (208), moving a user interface (210), maintaining a position of the selection element (212), receiving a second input signal (214), determining properties of the second input signal (216), selecting an item (218), generating a selection banner (220), displaying items within selection banner (222), generating a recommendation (224), and receiving a subsequent selection (226). Any of the foregoing operations may be performed by any one or more of the components or devices described herein, for example, the contact panel 114, first device 102, display 140, or second device 130.

Referring to 202, and in some embodiments, a display can be generated. A first device 102 can be in communication (e.g., communicatively coupled) with a second device 130 to generate and control a display of the second device 130. In some embodiments, the first device 102 can generate the display having a user interface 142 in response to the initiation or establishment of a user session with the second device 130. For example, the user session can be initiated or established responsive to turning on or interacting with the second device 130 by a user. In some embodiments, the user session can be initiated or established responsive to an input signal 120 generated via an input device 112 of the second device 130 and transmitted to the first device 102. For example, the user session can be initiated or established responsive to a predetermined pattern of contact or presses with a surface 118 of a contact panel 114 of the first device 102. The predetermined pattern of contact or presses can include, but not limited to, a double tap, swipe motion or contact having a predetermined pressure level with respect to the surface 118 of the contact panel 114.

The first device 102 can be configured to generate the display 140 having a user interface 142. In some embodiments, the user interface 142, or some of its items or elements, may remain in a background or in a non-visible state until a certain operating mode (e.g., navigation mode) is triggered. In some embodiments, the user interface 142 can be generated as a base layer or initial layer of the display 140. The first device 102 can select or configure dimensions for the user interface 142 based in part on the dimensions of the display 140 of the second device 130. In some embodiments, the dimensions of the user interface 142 can be equal to, smaller than, larger than, the same as or correspond to the dimensions of the display 140 and/or the contact pane 114. For example, the user interface 142 can include or correspond to a field of view of a user of the second device 130. In some embodiments, the first device 102 can determine what type of device (e.g., wearable device, handheld device) the second device 130 is and generate the user interface 142 based in part on the type of device. In some embodiments, the first device 102 can generate a control signal 122 for the second device 130 to generate a user interface 142 within the display 140. The control signal 122 can include instructions or commands to generate the user interface 142 within the display 140. The control signal 122 can include dimensions for the user interface 142 within the display 140.

In some embodiments, the first device 102 can generate one or more items 150 to be displayed within or as an overlay over the user interface 142 or as part of the user interface 142 (e.g., embedded within as child elements for instance). The first device 102 can generate items 150 based in part on the user of the second device 130. For example, the first device 102 can access a user profile (e.g., user classification, user preferences) associated with the user of the second device 130. The user profile can be maintained and stored in the storage device 110 and the first device 102 can identify one or more previously generated items 150 for the user of the second device 130 or identify one or more previous user sessions of the user of the second device 130. The first device 102 can use the previous items 150 or previous user sessions to generate a plurality of items 150 (e.g., selectable items) for the current user session. In some embodiments, the first device 102 can generate the items 150 based in part on the user session initiated with the second device 130. For example, the user session can correspond to a text entry application and the first device 102 can generate items 150 that include a plurality of text characters, alphanumeric characters, symbols, and/or numbers to represent a keyboard layout. In some embodiments, the user session with the second device 130 can include a virtual reality session or game (e.g., VR, AR, MR experience) and the first device 102 can generate items 150 corresponding to components, features or elements within the virtual reality session that a user can select. For example, the items 150 can correspond to features, objects, locations, roles, capabilities, modes or resources within the virtual reality session that the user can select (e.g., pick up, throw, interact with, consume, use, assume, activate, initialize, enter into) through a virtual reality experience. The first device 102 can generate a control signal 122 for the second device 130 to generate one or more items 150. In some embodiments, the first device 102 can generate one or more items 150 that include at least one of an icon, a symbol, a text element, a keypad element, a graphical element, a UI element, an image, a file or folder, a representation, a placeholder, a link, a resource, or an artificial reality object. The control signal 122 can include instructions or a command to generate, display and/or render the one or more items 150. The control signal 122 can include or indicate dimensions for each of the items 150, positioning of each of the items 150, and a layout of the items 150 with respect to the user interface 142.

In some embodiments, the first device 102 can generate a selection element 144 within the user interface 142 (e.g., as an overlay over the user interface 142). The first device 102 can generate a single selection element 144 or multiple selection elements 144. In some embodiments, the selection element 144 can include a selection reticle (e.g., graticule, cursor, cross-hair indicator) or selection object that can be positioned over different points or portions of the user interface 142 to select one or more items 150. The first device 102 can generate a control signal 122 for the second device 130 to generate a selection element 144. The control signal 122 can include instructions or a command to generate the selection element 144 or multiple selection elements 144. The control signal 122 can include dimensions for the selection element 144, a shape of the selection element 144 (e.g., circular, arrow or X shaped), and an initial or starting position of the selection element 144 with respect to the user interface 142 and the items 150. For example, the control signal 122 can include a position or location (e.g., pixel value, coordinates) with the display 140 and relative to the user interface 142 to provide the selection element 144 in a static position on the display for a user of the second device 130. In some embodiments, the selection element 144 can be generated at a center position or middle position of a field of view of the display 140. In some embodiments, the selection element 144 can be generated in offset position with respect to a center position or middle position of the field of view of the display 140. In some embodiments, the selection element 144 can be generated in a position based in part on one or more user preferences indicated in a user profile of the user of the second device 130.

In some embodiments, the same control signal 122 can include commands or instructions to generate the user interface 142, the items 150 and the selection element 144. In some embodiments, two or more control signals 122 can include commands or instructions to generate the user interface 142, the items 150 and the selection element 144 individually or a combination of two or more of the user interface 142, the items 150 and the selection element 144.

Referring to 204, and in some embodiments, a first input signal can be received. The first input signal 120 can include, correspond to or be responsive to establishing a contact point 116 with a surface 118 of a contact panel 114 of the first device 102. The first input signal 120 can correspond to a user-initiated contact with the surface 118 of the contact panel 114, a predetermined level of pressure applied to the surface 118 of the contact panel 114, a capacitive or conductive (or other type of) contact with the surface 118 of the contact panel 114, or contact for a predetermined time period with the surface 118 of the contact panel 114. In some embodiments, a user can directly or indirectly contact the surface 118 of the contact panel 114 through a contact device (e.g., stylus pen) or human contact (e.g., finger). The contact can establish a contact point 116 with the surface 118 of the contact panel 114. The contact point 116 can include the point, area or region of the surface 118 of the contact panel 114 that the user contacts. In some embodiments, responsive to the user establishing a contact point 116 with a surface 118 of a contact panel 114, the first device can operate the contact panel 114 in a navigation mode, or transition the contact panel 114 to the navigation mode during which a selection element 144 for selecting one or more items 150 of a user interface 142 in a display 140, is maintained at a determined location in the display 140.

The first device 102 can receive a first input signal 120 from a user of the first device 102 via the surface 118 of the contact panel 114 (e.g., touch screen) of the first device 102. The first input signal 120 can be used to control a user interface 142 and/or a selection element 144 provided within a display 140 of a second device 130. In some embodiments, the second device 130 can be a different device from the first device 102 or an external device from the first device 102. For example, the second device 130 can correspond to a wearable display device covering a user's field of view and the first device 102 can be out of the field of view (e.g., in a hand of the user) of the user, e.g., operated only via touch-related sensing without the user viewing the first device 102. The user can use contact and sliding motions along the surface 118 of the contact panel 114 of the first device 102 to control the display 140 and thus, contents within the field of view of the second device 130. In some embodiments, the user operates the first device via an input device 112.

The input device 112 can include the contact panel 114. In some embodiments, the input device 112 can include a keyboard, a display screen and/or a mouse. The first input signal 120 can be generated responsive to a user interaction with an input device 112 of the first device 102. In some embodiments, the input device 112 can be a part of or a component of the first device 102. In some embodiments, the input device 112 can be separate from the first device 102 (e.g., a mouse). The user interaction can include, but not limited to, contact (e.g., using a finger, stylus, mouse or other tool) with a contact panel 114 of the input device 112 and/or selection of an icon or symbol through a mouse or keyboard.

Referring to 206, and in some embodiments, properties of the first input signal 120 can be determined. The first device 102 can determine one or more properties of the first input signal, including a type of contact, motion information, directional information, and/or positional information. The first device 102 can determine one or more properties of the contact point 116 on the surface 118 of the contact panel 114, including a type of contact, a pressure level of the contact, a time value (e.g., duration of the contact), motion information, directional information, and positional information. In some embodiments, the first device 102 can determine that the input signal 120 corresponds to a first type of contact (e.g., a tap, touch or press, slide action) via the contact panel 114 of the first device 102. In some embodiments, the first type of contact can include a gesture or movement. For example, the first device can include a gyro sensor, angular velocity sensor or other form of a positional sensor to detect a gesture or movement (e.g., angular velocity) of the first device. The first input signal 120 can be generated response to different types of contact with the contact panel 114 of the first device 102. For example, the types of contact can include any type or action or motion such as a swipe, a slide motion, a pressing motion, or a release of contact (e.g., end of contact). The first input signal 120 can indicate the type of contact, directional information corresponding to a motion of the contact with respect to a surface of the contact panel 114 and/or a length of contact (e.g., duration) with the surface of the contact panel 114 of the first device 102. In some embodiments, the first device 102 can determine that the first type of contact corresponds to a pressing motion or action to establish the contact point 116 with the surface 118 of the contact panel 114. The first device 102 can determine that the user maintains contact with the contact panel 114 for a predetermined time period and/or having a predetermined pressure level, and a contact point 116 can be established responsive to the contact with the surface 118 of the contact panel 114.

In some embodiments, the first type of contact can include a slide motion along the surface 118 of the contact panel 114 of the first device 102 from a user of the first device 102, to establish a contact point 116. For example, the first type of contact can include a slide motion in which the user contacts the surface of the contact panel 114 and moves, for example, a finger or stylus pen from a first position on the surface 118 of the contact panel 114 to a second position on the surface 118 of the contact panel 114 and the user maintains contact with the surface 118 of the contact panel 114 at the second position and a contact point 116 can be established responsive to the contact with the surface 118 of the contact panel 114.

The first input signal 120 or first type of contact can trigger or change a mode of operation (e.g., cause a transition between modes of operations) of the first device and/or second device 130. For example, the first input signal 120 responsive to the first type of contact can transition the second device 130 or the display 140 of the second device 130 from a viewing mode to a navigation mode (e.g., interaction or positioning mode) responsive to the first type of contact (e.g., press contact, slide contact, maintained contact, swipe contact). In some embodiments, the navigation mode can be configured to enable moving or repositioning of the user interface 142 of the display 140 of the second device 130 responsive to user interaction with the contact panel 114 of the first device 102.

Referring to 208, and in some embodiments, directional information for first input signal 120 can be determined. The first device 102 can determine a direction of motion of the contact point 116 along the surface 118 of the contact panel 114. In some embodiments, the first device 102 can determine an initial or start position of the contact point 116 and a second, or end position of the contact point 116 on the surface 118 of the contact panel 114. The first device 102 can determine a distance along the surface of the contact panel 114 for the contact corresponding to a distance from the first position on the surface 118 to the second position on the surface 118 of the contact panel 114. For example, the first device 102 can determine a direction of motion along the surface 118 of the contact panel 114 for the contact corresponding to a direction of motion to move the contact point 116 from the first position on the surface 118 to the second position on the surface 118 of the contact panel 114.

In some embodiments, the first device 102 can determine, via the contact panel 114, a first direction of movement of the contact point 116 on the surface 118 of the contact panel 114. The first device can generate and transmit a control signal 122 to a processor 132 of the second device 130 or a display 140, to render an image of the user interface 142 and the items 150 within the user interface 142 moving in a direction in accordance with the first direction of movement of the contact point 116.

In some embodiments, the first device 102 can determine, via the contact panel 114, a spatial displacement of the contact point 116 on the surface 118 of the contact panel 114 or a spatial displacement of contact with the surface 118 of the contact panel 114. In some embodiments, the first device 102 can determine, via the contact panel 114, a speed of movement of the contact point 116 on the surface 118 of the contact panel 114 or a speed of contact with the surface 118 of the contact panel 114. In some embodiments, the first device 102 can determine, via the contact panel 114, a pressure level of the contact point 116 on the surface 118 of the contact panel 114 or a pressure level of the contact with the surface 118 of the contact panel 114. The first device can generate and transmit a control signal 122 to a processor 132 of the second device 130 or a display 140 display to render an image of the user interface 142 and the items 150 within the user interface 142 moving in a direction in accordance with the first direction of movement, at a speed in accordance with the detected speed, at a spatial displacement in accordance with the detected spatial displacement or any combination thereof.

Referring to 210, and in some embodiments, a user interface 142 can be moved. In some embodiments, the user interface 142 (UI) can be moved in the display 140 relative to the selection element 144 maintained at the determined location, by moving the contact point 116 on the surface 118 of the contact panel 114 in the navigation mode. The user interface 142 can include at least one item 150 that can be selectable using the selection element 144. The first device 102, responsive to the first type of contact, can move the user interface 142 of the display 140 in a direction corresponding to a motion of direction of the contact point 116 on the surface 118 of the contact panel 114 of the first device 102. The first device 102 can move or reposition the user interface 142 the same distance and in the same direction as the detected motion of the contact point 116 along the surface 118 of the contact panel 114. For example, the first device 102 can move the user interface 142 and items 150 in a direction that is the same as the detected motion of the contact point 116 along the surface 118 of the contact panel 114 or a degree or percentage of the detected motion of the contact point 116 along the surface 118 of the contact panel 114. In some embodiments, the user interface 142 and items 150 can be moved in the display 140 in a direction that is opposite to or different from the direction of movement of the contact point 116 on the surface 118 of the contact panel 114.

The first device 102 can move the user interface 142 and items 150 in at the same speed (and/or acceleration) as the detected speed (and/or acceleration) of the contact point 116 along the surface 118 of the contact panel 114 or at a speed (and/or acceleration) scaled relative to the detected speed (and/or acceleration) of the contact point 116 along the surface 118 of the contact panel 114 (e.g., twice the speed and/or acceleration). In some embodiments, the user interface 142 and the items 150 can be moved in the display 140 at a speed that is relative to (e.g., scaled using a preconfigured factor) a speed of movement of the contact point 116 on the surface 118 of the contact panel 114. The first device 102 can move the user interface 142 and items 150 in a distance (e.g., spatial displacement) that is the same as the detected distance of the contact point 116 on the surface 118 of the contact panel 114 or scaled multiple or percentage of the detected distance of the contact point 116 on the surface 118 of the contact panel 114. In some embodiments, the user interface 142 and the items 150 can be moved in the display 140 by a spatial displacement that is relative to that of the contact point 116 on the surface 118 of the contact panel 114. In some embodiments, the items 150 can be generated within or embedded within the user interface 142, and the first device 102 can slide or move the user interface 142 such that one or more of the items 150 move to a different portion or region of the display 140 from an original or initial portion or region of the display 140 at which the respective items 150 were positioned.

Referring to 212, and in some embodiments, a position of the selection element 144 can be maintained. The first device 102 can, responsive to the first type of contact or operation in the navigation mode, maintain the selection element 144 in a static position or determined location within the display 140. In some embodiments, the selection element 144 can be maintained in a static position within the display 140, while the user interface 142 can be moved or repositioned under or with respect to the selection element 144, such that different regions of the user interface 142 can be moved or repositioned under or within a visual representation of the selection threshold 15 of the selection element 144. The selection element 144 can be maintained in a static position within the display 140 and the items 150 can be moved or repositioned under or with respect to the selection element 144 such that different items 150 may be disposed under, within or in contact with a visual representation of the selection threshold 145 of the selection element 144, as the user interface 142 and the items 150 are moved or repositioned relative to the static position of the selection element 144. In some embodiments, the first device 102 can slide the items 150 within the display 140 to reposition the items 150 such that different items 150 are displayed within the selection threshold 145 of the selection element 144, as the first device 102 moves the user interface 142 and the items 150.

In some embodiments, the user can trigger a selection mode of operation (which can co-exist with the navigation mode) by moving at least one item 150 to within a selection threshold of the selection element 144. The contact panel may be configured or designed to provide sensory (e.g., haptic) feedback to the user to indicate the triggering of or entering into such a mode of operation. In some embodiments, the selection element 144 can (e.g., in the selection mode) modify viewing properties or parameters of one or more items 150 or portions of user interface 142. For example, the selection element 144 can modify viewing properties or parameters of one or more items 150 or portions of user interface 142 when the selection threshold 145 of the selection element 144 is met (e.g., when the selection element is hovering over the respective one or more items 150 or portions of user interface 142 for a determined time period), by magnifying, zooming in or changing a visual aspect (e.g., color, font, perceived elevation, brightness, enhanced outline) of the one or more items 150 or portions of user interface 142, and/or generating information (in a pop up or widget or overlap) about the respective one or more items 150 or portions of user interface 142. Thus, the user can cause a change in the viewing properties of the one or more items 150 or portions of user interface 142, by moving the contact point 116 to a corresponding position along the surface 118 of the contact panel 114 (and for instance maintaining that respective position on the surface 118 of the contact panel 114 for a predetermined duration of time) such that the selection threshold 145 of the selection element 144 is satisfied by the one or more items 150 or portions of user interface 142. The contact panel may be configured or designed to provide sensory (e.g., haptic) feedback, auditory feedback and/or visual feedback to the user to indicate that an item is selectable and/or that the item's viewing property is changed, e.g., in response to the selection threshold 145 of the selection element 144 being met by the item 150.

Referring to 214, and in some embodiments, a second input signal can be received. The first device 102 can receive a second input signal 120 corresponding to a second type of the contact with the contact panel 114 of the first device 102. The second input signal 120 can be triggered by, correspond to or be responsive to removing the contact point 116 with the contact panel 114, or releasing contact with the surface 118 of the contact panel 114 that causes the contact point 116 to be removed. In some embodiments, the first device 102 can receive the second input signal 120 corresponding to the second type of the contact when the selection element 144 is positioned over at least one item 150 provided in the user interface 142 of the display 140 or when at least one portion (e.g., edge, corner) of at least one item 150 is displayed within the selection threshold 145 of the selection element 144. The second type of contact can be a different type of contact from the first type of contact.

The second input signal 120 can be generated responsive to a second user interaction with the input device 112 of the first device 102. The second input signal 120 can be generated responsive to the user of the second device 130 ending, removing or discontinuing contact with the surface 118 of the contact panel 114 of the display 140 or releasing contact with the surface 118 of the contact panel 114 of the display 140, that results in removing the contact point 116 from the contact panel 114. The first device 102 can detect when the contact with the surface 118 of the contact panel 114 of the display 140 ends. The first device 102 can receive the second input signal 120 from the first device 102 via the contact panel 114 of the first device 102. The second input signal 120 can be used to stop or end movement of the user interface 142 and items 150 provided within the display 140 of the second device 130. The second input signal 120 can be used to remove the user interface 142 and items 150 from being displayed within the display 140 (e.g., by terminating the navigation mode and/or the selection mode).

Referring to 216, and in some embodiments, properties of the second input signal can be determined. The first device 102 can determine one or more properties of the second input signal, including a type of contact, motion information, directional information, and positional information with respect to the surface 118 of the contact panel 114. In some embodiments, the first device 102 can determine that the second input signal 120 corresponds to a second type of contact via the contact panel 114 of the first device 102. The second input signal 120 can be generated in response to different types of contact with the contact panel 114 of the first device 102. For example, the types of contact can include any type of user action or motion such as a swipe, a slide motion, a pressing motion, or a release of contact (e.g., end of contact). The second input signal 120 can indicate the type of contact, directional information corresponding to a motion of the contact with respect to a surface of the contact panel 114 and/or a length of contact (e.g., duration between a first user interaction and a second user interaction) with respect to the surface of the contact panel 114 of the first device 102.

In some embodiments, the first device 102 can determine that the second type of contact corresponds to a release from contact with the surface 118 of the contact panel 114 of the first device 102 by the user of the first device 102. The first device 102 can determine that the user is no longer maintaining or in contact with the surface 118 of the contact panel 114 and has ended contact with the surface 118 of the contact panel 114. In some embodiments, the first device 102 can determine a duration (e.g., time period, time value) of contact corresponding to a duration of the contact between the first input signal and the second input signal. For example, the first device 102 can determine a duration corresponding to a time period started when the user first interacts with the surface 118 of the contact panel 114 through the first type of contact, and when the user ends contact with the surface 118 of the contact panel 114 through the second type of contact with the contact panel 114. The first device 102 can determine a duration corresponding to a time period started when the contact point 116 is established on the surface 118 of the contact panel 114 and when the contact point 116 is removed from the surface 118 of the contact panel 114.

In some embodiments, the first device 102 can compare the duration value for the second input signal 120 to a contact threshold. The contact threshold can include a time value, time period or time range. The contact threshold can be used to indicate if the contact maintained between the first user interaction (e.g., initial contact) and second user interaction (e.g., release of contact) or between the establishment of the contact point 116 and the removal of the contact point 116, corresponds to an intended, valid, proper, correct or appropriate contact. In some embodiments, if the duration value for the second input signal 120 is greater than or equal to the contact threshold, this can indicate that the contact was an intended, valid, proper, correct or appropriate contact and should be counted. If the duration value for the second input signal 120 is less than the contact threshold, this can indicate that the contact may have been inadvertent and should not be counted or can be ignored for selection reasons.

The second input signal 120 or second type of contact can trigger or change a mode of operation (or cause a transition between modes of operation) of the first device and/or the second device 130. For example, the second input signal 120 can transition the second device 130 or the display 140 of the second device 130 from a navigation mode to a selection mode responsive to the second type of contact. In some embodiments, the selection mode can be configured to allow selection of one or more items 150 positioned within the selection threshold 145 of the selection element 144 of the display 140 of the second device 130 responsive to user interaction with the contact panel 114 of the first device 102. In some embodiments, the second device 130 or the display 140 of the second device 130 can operate in the navigation mode and the selection mode simultaneously.

Referring to 218, and in some embodiments, an item 150 can be selected. The first device 102, responsive to the second input signal 120, can select the item 150 provided, positioned or displayed within the selection threshold 145 of the selection element 144 of the display 140. For example, the first device 102 can detect or determine if at least one item 150 or a portion of at least one item 150 is disposed, positioned or displayed within the selection threshold 145 of the selection element 144 of the display 140 at the time of the second user interaction and the second input signal 120. In some embodiments, the first device 102 can detect or determine if a portion of an item 150 (e.g., half of, an edge of, a corner of the item) is disposed, positioned or displayed within the selection threshold 145 of the selection element 144 of the display 140 at the time of the second user interaction and the second input signal 120. In some embodiments, the first device 102 can detect or determine a nearest item 150 or one or more items 150 within a predetermined distance of the selection element 144, as determined by the selection threshold 145 of the selection element 144, at the time of the second user interaction and the second input signal 120.

At least one item 150 that is moved within or satisfying a selection threshold 145 of the selection element 144 can be selected, for example, by removing the contact point 116 with the contact panel 114. In some embodiments, the first device 102 can detect that the one of the at least one item 150 is within the selection threshold 145 of the selection element 144 and can activate the selection mode of the contact panel 114 responsive to the detecting. For example, an item 150 or a portion of an item 150 can be within the selection threshold 145 of the selection element 144 for a determined time period, and the first device 102 can activate the selection mode of the contact panel 114 responsive to detecting the determined time period. In some embodiments, an alert or feedback can be provided to a user of the first device 102 and/or second device 130 to indicate the change in mode and/or indicate the selection mode. For example, in some embodiments, a sensory feedback (e.g., vibration), auditory feedback (e.g., noise, alarm), or visual feedback (e.g., alert, notification, message) can be provided to a user of the first device 102 and/or second device 130 to indicate the change in mode and/or indicate the activation of the selection mode. The sensory feedback, auditory feedback, or visual feedback to the user can indicate that the one of the at least one item 150 is selectable using the selection element 144. In some embodiments, activating the selection mode can include displaying supplemental information, at least one supplemental selectable item 150, or a recommendation 152 corresponding to the detected one of the at least one item 150. The first device 102 can select an item 150 or multiple items 150 that are provided, positioned or displayed within the selection element 144, or having at least a portion of the respective one or more items 150 provided, positioned or displayed within the selection element 144, or can select one or more items 150 provided, positioned or displayed within a predetermined distance from the selection element 144.

In some embodiments, the selection element 144 can be positioned over a select-disabled space (e.g., a designated safe-zone) within the user interface 142, or a blank space (e.g. any space devoid of selectable items) within the user interface 142 that is not positioned over or near at least one item 150. The select-disabled space or blank space can correspond to or include an area or region of the user interface 142 that a user can make use to not make a selection or to begin the selection process over again. For example, by positioning (the selection threshold 145 of) the selection element 144 over the select-disabled space or blank space, and releasing contact (removing the contact point) while at that position, the user can avoid making a selection of any item in the user interface or display. In some embodiments, the user can determine not to make a selection and can move the user interface 142 and items 150 with respect to the selection element 144 such that the selection threshold 145 of the selection element 144 is positioned over a select-disabled space or blank space of the user interface 142 and thus not positioned over at least one item 150. The user can remove the contact point 116 on the contact panel 114 or release contact with the surface 118 of the contact panel 114, to "select" or interact with the select-disabled space or blank space of the user interface 142 (to cancel the slide selection process) and not select any item 150.

Referring to 220, and in some embodiments, a selection banner can be generated. The first device 102 can generate and display a selection banner 146 within a region of the user interface 142 or as an overlay over a region of the user interface 142. In some embodiments, the first device 102 can generate the selection banner 146 responsive to the selection of at least one item 150. In some embodiments, the first device 102 can generate the selection banner 146 when the user interface 142 is generated. The first device 102 can generate a control signal 122 for the second device 130 to generate the selection banner 146. The control signal 122 for the selection banner 146 can include instructions or commands to generate the selection banner 146. The control signal 122 for the selection banner 146 can include a location, position or region of the user interface 142 to generate the selection banner 146. In some embodiments, the location, position or region of the user interface 142 can include coordinates within the display 140 or a range of pixel values within the display 140. The control signal 122 for the selection banner 146 can include dimensions of the selection banner 146 and a shape (e.g., rectangular, circular) for the selection banner 146.

Referring to 222, and in some embodiments, one or more items 150 can be displayed within the selection banner 146. The first device 102 can display at least one selected item 150 within the selection banner 146. In some embodiments, the first device 102 responsive to the second input signal 120, can provide the item 150 within a selection banner 146 in the user interface 142 of the display 140. The selection banner 146 can include one or more selected items 150 for display through the second device 130. In some embodiments, responsive to the selection of one or more items 150, the first device 102 can generate one or more items 150 that are the same as the selected one or more items 150 and display the one or more items 150 within the selection banner 146. For example, the selected item 150 can include the letter "J" and the first device 102 can generate a letter "J" within the selection element 144 and leave or maintain the selected letter "J" within the user interface 142 of the display 140. Thus, the user of the second device 130 can select the letter "J" again at a subsequent time using the selection element 144. In some embodiments, the first device 102 can move the selected one or more items 150 from their respective position within the user interface 142 and move the one or more items 150 such that they are positioned within the selection element 144. In some embodiments, the selected item 150 can include an action in a virtual reality game (e.g., selection of a weapon) and the first device 102 can generate a symbol representing the previously selected weapon within the selection element 144 and leave or maintain the selected weapon as a choice within the user interface 142 of the display 140. Thus, the user of the second device 130 can select the same weapon a second or subsequent time using the selection element 144. In some embodiments, the first device 102 can move the selected one or more items 150 from their respective position within the user interface 142 and move the one or more items 150 such that they are positioned within the selection element 144.

Referring to 224, and in some embodiments, a recommendation can be generated. The first device 102 can generate one or more recommendations 152 for items 150 in a recommendation window 148 provided within the user interface 142 of the display 140 of the second device 130 prior to selecting, or responsive to selecting the item 150. The one or more recommendations 152 can correspond to the selected item 150. For example, the first device 102 can generate a recommendation 152 based in part on the most recent or last item 150 selected, multiple recent items 150 selected, or a combination of items 150 selected during a current user session. In some embodiments, the user session can correspond to a text entry session and the most recent or last item selected 150 can include the letter "B." The first device 102 can execute a recommendation device 106 to generate one or more recommendations for a subsequent item 150, such as a subsequent letter to the previous letter "B" selected. The recommendation device 106 can generate the recommendation 152 for the subsequent letter based in part on words or phrases the user may be trying the spell, a user profile, and/or a user history. For example, in some embodiments, the recommendation 152 following the selected item 150 letter "B" can include a recommendation 152 for the letter "o" corresponding to the word "Boston." The first device 102 can display the one or more recommendations 152 in the recommendation window 148 so that the user can select at least one recommendation 152 from the recommendation window 148.

The first device 102 can generate a control signal 122 for the second device 130 to generate the recommendation window 148. The control signal 122 for the recommendation window 148 can include instructions or commands to generate the recommendation window 148. The control signal 122 for the recommendation window 148 can include a location, position or region of the user interface 142 to generate the recommendation window 148. In some embodiments, the location, position or region of the user interface 142 can include coordinates within the display 140 or a range of pixel values within the display 140. The control signal 122 for the recommendation window 148 can include dimensions of the recommendation window 148 and a shape (e.g., rectangular, circular) for the recommendation window 148.

In some embodiments, the first device 102 using the recommendation device 106 can generate recommendations 152 based in part on the user profile or user history of the user of the second device 130. For example, the recommendation device 106 can use a most recent or last item 150 selected, multiple recent items 150 selected, or a combination of items 150 selected during a current user session and match the selected item 150 to an item 150 selected in a previous user session. The first device 102 can determine from the match one or more full words or phrases eventually entered by the user during the previous one or more user sessions and generate one or more recommendations 152 based in part on the match identified with previous user sessions and a user history.

Referring to 226, and in some embodiments, a subsequent selection can be received. The first device 102 can receive one or more subsequent selections in addition to the first selection or initial selection. For example, the first device can receive a third input signal 120 via a contact panel 114 of the first device 102. The third input signal 120 can be generated responsive to a user interaction with the input device 112 of the first device 102. In some embodiments, the user interaction can include, but not limited to, contact with a surface 118 of the contact panel 114 of the input device 112 or selection of an icon or symbol through a mouse or keyboard. In some embodiments, a second contact point 116 can be established with the surface 118 of the contact panel 114 responsive to the third input signal 120.

The first device 102 can determine properties of the third input signal, including a type of contact, motion information, directional information, and positional information. In some embodiments, the first device 102 can determine that the third input signal 120 corresponds to the first type of contact via the surface 118 of the contact panel 114 of the first device 102. The third input signal 120 can be generated response to different types of contact with the contact panel 114 of the first device 102. For example, the types of contact can include a swipe, a slide motion, a pressing motion, or a release of contact (e.g., end of contact). The third input signal 120 can indicate the type of contact, directional information corresponding to a motion of the contact with respect to a surface of the contact panel 114 and a length of contact (e.g., duration) with respect to the surface of the contact panel 114 of the first device 102. In some embodiments, the first device 102 can determine that the first type of contact corresponds to a press contact, a press contact having a predetermined pressure level or a slide motion along the surface 118 of the contact panel 114 of the first device 102 from a user of the first device 102. The first device 102 can determine that the user maintains contact with the surface 118 of the contact panel 114.

In some embodiments, the first device 102 can determine the directional information for third input signal 120, including a direction of motion of the contact point 116 with the surface 118 of the contact panel 114. The first device 102 can determine a third, initial or start position of the contact point 116 and a fourth, or end position of the contact point 116 with the surface 118 of the contact panel 114. The first device 102 can determine a distance along the surface of the contact panel 114 for the contact point 116 corresponding to a distance from the third position on the surface to the fourth position on the surface 118 of the contact panel 114. The first device 102 can determine a direction of motion along the surface 118 of the contact panel 114 for the contact point 116 corresponding to a direction of motion to move from the third position on the surface 118 to the fourth position on the surface 118 of the contact panel 114.

The first device 102, responsive to the third input signal and user interaction, can move the user interface 142 of the display 140 in a direction corresponding to the motion of the contact point 116 on the surface 118 of the contact panel 114 of the first device 102. The first device 102 can move or reposition the user interface 142 and the items 150 by a distance determined relative to the distance of the detected motion of the contact point 116 on the surface 118 of the contact panel 114. The first device 102 can move the user interface 142 and items 150 in a direction that is opposite to or the same as the detected motion of the contact point 116 along the surface 118 of the contact panel 114 In some embodiments, the items 150 can be generated within or embedded within the user interface 142, and the first device 102 can slide or move the user interface 142 such that one or more of the items 150 move to a different portion or region of the display 140 from an original portion or region of the display 140 that the respective items 150 were positioned at.

The first device 102 can maintain a position of the selection element 144 as the user interface 142 having the items 150 is moved. The first device 102 can, responsive to the third input signal, maintain the selection element 144 in a static position or determined location within the display 140. In some embodiments, the selection element 144 can be maintained in a static position within the display 140 and the user interface 142 can be moved or repositioned under or with respect to the selection element 144 such that different regions of the user interface 142 are moved or repositioned relative to the selection threshold 145 of the selection element 144. The selection element 144 can be maintained in a static position within the display 140 and the items 150 can be moved or repositioned with respect to the selection element 144 such that different items 150 may move closer to or away from a visual representation of the selection element 144, as the items 150 are moved or repositioned with respect to the static position of the selection element 144.

The first device 102 can receive a fourth input signal 120. The first device 102 can determine one or more properties of the fourth input signal 120, including a type of contact, motion information, directional information, and/or positional information. In some embodiments, the fourth input signal 120 can correspond to a release of contact with the surface 118 of the contact panel 114 of the first device 102 or a second type of contact via the surface 18 of the contact panel 114 of the first device 102. The release can be subsequent to the contact initiated with the third input signal 120. In some embodiments, the fourth input signal 120 can indicate the type of contact, directional information corresponding to a motion of the contact with respect to a surface of the contact panel 114, and/or a length of contact (e.g., duration) with respect to the surface of the contact panel 114 of the first device 102. For example, the first device 102 can determine a duration corresponding to a time period started when the user first interacts with the contact panel 114 through the first type of contact and when the user ends contact with the contact panel 114 through the second type of contact with the contact panel 114.

In some embodiments, the first device 102 can compare the duration value for the fourth input signal 120 to a contact threshold. If the duration value for the fourth input signal 120 is greater than or equal to the contact threshold, this can indicate that the contact was a correct, valid, proper or appropriate contact and should be counted. If the duration value for the fourth input signal 120 is less than the contact threshold, this can indicate that the contact may have been inadvertent and should not be counted. The fourth input signal 120 or second type of contact can trigger or change a mode of operation (or cause a transition between modes of operation) of the second device 130 or the display 140 of the second device 130, for example from the navigation mode to the selection mode, responsive to the second type of contact. In some embodiments, the selection mode can be configured to select one or more items 150 coinciding with (e.g. within a selection threshold of) the selection element 144 responsive to user interaction with the contact panel 114 of the first device 102.

The first device 102, responsive to the fourth input signal 120, can select the item 150 provided within the user interface 142 and coinciding with the selection element 144 of the display 140. For example, the first device 102 can detect or determine if an item 150 is disposed, positioned or displayed within the selection element 144 of the display 140 at the time of the fourth user interaction and the fourth input signal 120. In some embodiments, the first device 102 can detect or determine if a portion of an item 150 (e.g., half of, an edge of, a corner of the item) is disposed, positioned or displayed within the selection element 144 of the display 140 at the time of the fourth user interaction and the fourth input signal 120. In some embodiments, the first device 102 can detect or determine a nearest item 150 or one or more items 150 within a predetermined distance of the selection element 144 at the time of the fourth user interaction and the fourth input signal 120. The first device 102 can select the determined item 150 or the determined one or more items 150.

The first device 102 can display the selected item 150 within the selection banner 146 with the one or more previously selected items 150 for the current user session. In some embodiments, the first device 102 responsive to the fourth input signal 120, can provide or move the item 150 within the selection banner 146 in the user interface 142 of the display 140. The first device 12 can continually transition between viewing, interaction and selection modes during a user session until the respective user has completed the current user session for instance. For example, the first device 102, responsive to different forms of contact with the contact panel 114 of the first device 102, can be used to control the selection of one or more items 150 according to the user interactions and the different types of contact.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
responsive to a user establishing a contact point with a surface of a contact panel of a device using a predefined series of contact-based gestures on the contact panel, to enter a navigation mode, operating the contact panel in the navigation mode during which a selection element for selecting one or more items of a user interface (UI) in a display, is maintained at a determined location in the display;
moving the UI together with a first item of the UI in the display relative to the selection element maintained at the determined location, by sliding the contact point relative to and along the surface of the contact panel in the navigation mode, to cause the first item to move along a path in the display towards the selection element while the selection element remains at the determined location in the display, wherein a haptic response is generated by the surface of the contact panel responsive to the first item moving into a selection threshold of the selection element while sliding the contact point on the surface of the contact panel, the haptic response indicating activating of a selection mode and that the first item is selectable using the selection element, and wherein the display comprises a wearable display device that provides a field of view to the user, and is different from the contact panel, wherein activating the selection mode comprises displaying supplemental information or at least one supplemental selectable item corresponding to the first item; and
initiating selecting of the first item, that is moved within the selection threshold of the selection element, by removing the contact point with the contact panel, wherein the first item is selected if a duration that extends from establishing the contact point with the contact panel, to the removing of the contact point with the contact panel after sliding the contact point on the contact panel, meets at least a threshold value.

2. The method of claim 1, wherein establishing the contact point with the surface of the contact panel includes establishing contact with the surface i) for at least a predefined time period, or ii) using a specified force on the surface.

3. The method of claim 1, comprising:
determining, via the contact panel, a first direction of movement of the contact point on the surface of the contact panel; and
transmitting, by the contact panel, a signal to a processor of the display to render an image of the UI moving in a direction in accordance with the first direction of movement.

4. The method of claim 1, comprising moving the UI in the display in a direction that is opposite to or same as a direction of movement of the contact point on the surface of the contact panel.

5. The method of claim 1, comprising moving the UI in the display at a speed that is relative to a speed of movement of the contact point on the surface of the contact panel.

6. The method of claim 1, comprising moving the UI in the display by a spatial displacement that is relative to that of the contact point on the surface of the contact panel.

7. The method of claim 1, wherein the first item includes at least one of an icon, a symbol, a text element, a keypad element, an image, a file or folder, or an artificial reality object.

8. The method of claim 1, further comprising
detecting that the first item is within the selection threshold of the selection element; and
activating the selection mode of the contact panel in response to the detecting.

9. A device comprising:
a display; and
one or more processors configured to:
responsive to a user establishing a contact point with a surface of a contact panel of the device using a predefined series of contact-based gestures on the contact panel, to enter a navigation mode, operate the contact panel in the navigation mode during which a selection element for selecting one or more items of a user interface (UI) in the display, is maintained at a determined location in the display, wherein the display comprises a wearable display device that provides a field of view to the user, and is different from the contact panel;
move the UI together with a first item of the UI in the display relative to the selection element maintained at the determined location, by sliding the contact point relative to and along the surface of the contact panel in the navigation mode, to cause the first item to move along a path in the display towards the selection element while the selection element remains at the determined location in the display, wherein a haptic response is generated by the surface of the contact panel responsive to the first item moving into a selection threshold of the selection element while sliding the contact point on the surface of the contact panel, the haptic response indicating activating of a selection mode and that the first item is selectable using the selection element, wherein activating the selection mode comprises displaying supplemental information or at least one supplemental selectable item corresponding to the first item; and
initiate selecting of the first item, that is moved within the selection threshold of the selection element, by removing the contact point with the contact panel, wherein the first item is selected if a duration that extends from establishing the contact point with the contact panel, to the removing of the contact point with the contact panel after sliding the contact point on the contact panel, meets at least a threshold value.

10. The device of claim 9, wherein the one or more processors are further configured to detect that the contact point is established with the surface of the contact panel, by detecting that contact with the surface is established i) for at least a predefined time period, or ii) using a specified force on the surface.

11. The device of claim 9, wherein the one or more processors are further configured to:
determine a first direction of movement of the contact point on the surface of the contact panel; and
transmit a signal to a processor of the display to render an image of the UI moving in a direction in accordance with the first direction of movement.

12. The device of claim 9, wherein the one or more processors are further configured to:
detect that the first item is within the selection threshold of the selection element; and
activate the selection mode of the contact panel in response to the detecting.

13. A non-transitory computer readable medium storing instructions when executed by one or more processors cause the one or more processors to:
responsive to a user establishing a contact point with a surface of a contact panel of a device using a predefined series of contact-based gestures on the contact panel, to enter a navigation mode, operate the contact panel in the navigation mode during which a selection element for selecting one or more items of a user interface (UI) in the display, is maintained at a determined location in the display;
move the UI together with a first item of the UI in the display relative to the selection element maintained at the determined location, by sliding the contact point relative to and along the surface of the contact panel in the navigation mode, to cause the first item to move along a path in the display towards the selection element while the selection element remains at the determined location in the display, wherein a haptic response is generated by the surface of the contact panel responsive to the first item moving into a selection threshold of the selection element while sliding the contact point on the surface of the contact panel, the haptic response indicating activating of a selection mode and that the first item is selectable using the selection element, and the display comprises a wearable display device that provides a field of view to the user, and is different from the contact panel, wherein activating the selection mode comprises displaying supplemental information or at least one supplemental selectable item corresponding to the first item; and
initiate selecting of the first item, that is moved within the selection threshold of the selection element, by removing the contact point with the contact panel, wherein the first item is selected if a duration that extends from establishing the contact point with the contact panel, to the removing of the contact point with the contact panel after sliding the contact point on the contact panel, meets at least a threshold value.

14. The non-transitory computer readable medium of claim 13, further comprising instructions when executed by the one or more processors further cause the one or more processors to:
detect that the first item is within the selection threshold of the selection element; and
activate the selection mode of the contact panel in response to the detecting.

* * * * *